Figure 3:
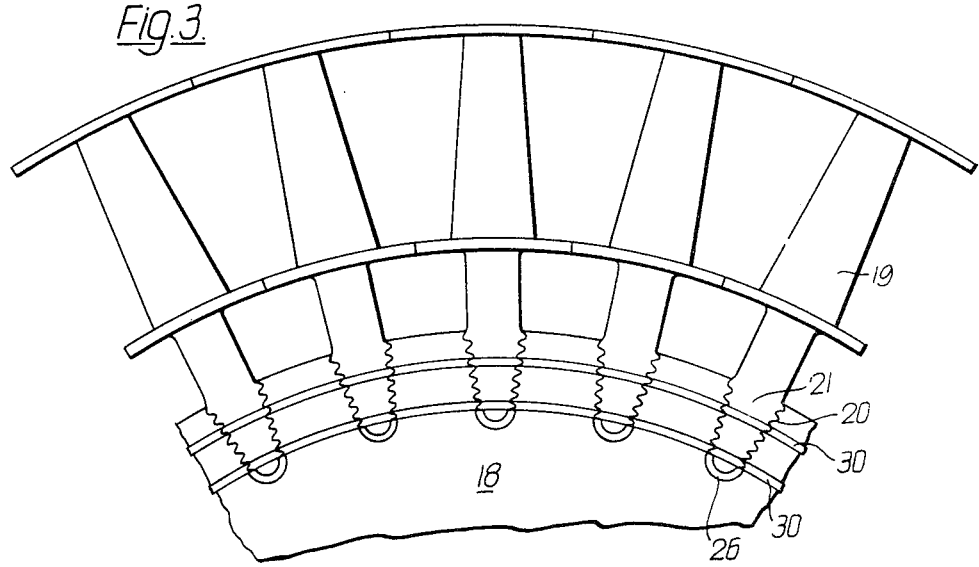

United States Patent [19]

Pask

[11] 4,218,189
[45] Aug. 19, 1980

[54] SEALING MEANS FOR BLADED ROTOR FOR A GAS TURBINE ENGINE

[75] Inventor: George Pask, Stanton-by-Bridge, England

[73] Assignee: Rolls-Royce Limited, London, England

[21] Appl. No.: 928,982

[22] Filed: Jul. 28, 1978

[30] Foreign Application Priority Data

Aug. 9, 1977 [GB] United Kingdom ............ 33253/77

[51] Int. Cl.³ .................... F01D 11/00; F01D 5/18
[52] U.S. Cl. .................................. 416/174; 416/95; 416/219 R; 277/56
[58] Field of Search ............. 416/95, 174; 271/55, 271/56, 57

[56] References Cited

U.S. PATENT DOCUMENTS

| | | | |
|---|---|---|---|
| 2,648,519 | 8/1953 | Campini | 416/95 |
| 3,437,313 | 4/1969 | Moore | 416/95 |
| 3,490,852 | 1/1970 | Carlstrom et al. | 416/95 |
| 3,635,586 | 1/1972 | Kent et al. | 416/95 X |
| 3,703,808 | 11/1972 | Stearns | 416/95 X |
| 3,791,758 | 2/1974 | Jenkinson | 416/95 X |
| 3,801,218 | 4/1974 | Moore | 416/95 X |
| 3,853,425 | 12/1974 | Scalzo et al. | 416/95 |

FOREIGN PATENT DOCUMENTS 1476237  6/1977  United Kingdom ............ 416/95

*Primary Examiner*—Leonard E. Smith
*Attorney, Agent, or Firm*—Cushman, Darby & Cushman

[57] ABSTRACT

A bladed rotor for a gas turbine engine comprises a rotor disc having a plurality of blade retaining slots in its periphery and a rotor blade mounted in each slot, and sealing means between the rotor and the adjacent static structure comprising an annular projection from adjacent the disc periphery adapted to coact with an annular feature on the static structure. The annular projection is made up of a plurality of abutting segments, alternate ones of which project from the disc and one of the rotor blades respectively.

8 Claims, 6 Drawing Figures

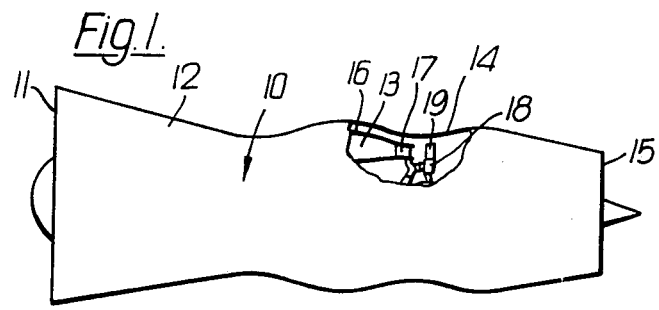
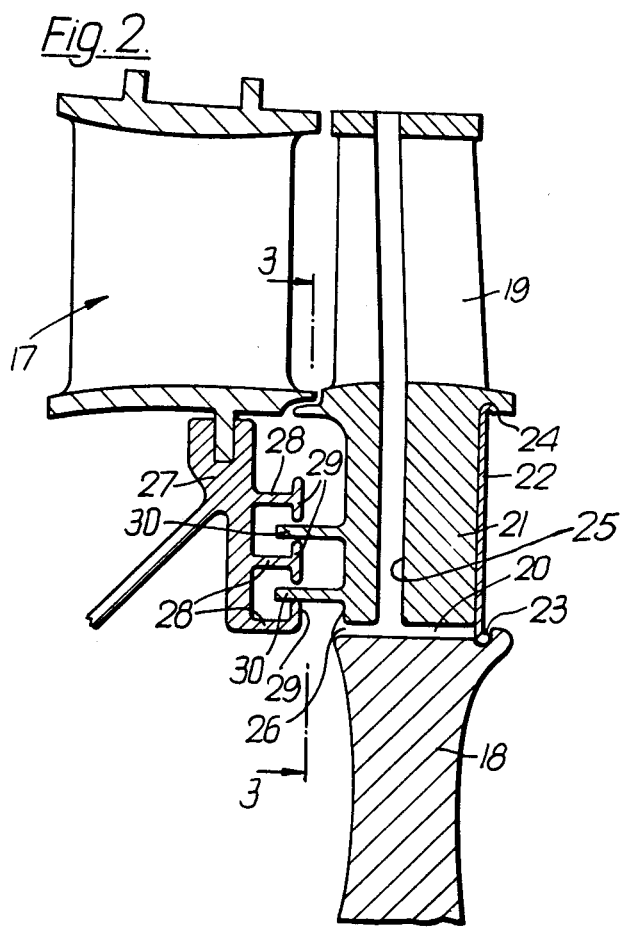

SEALING MEANS FOR BLADED ROTOR FOR A GAS TURBINE ENGINE

This invention relates to a bladed rotor for a gas turbine engine.

In various of the bladed rotors in gas turbine engines, it is necessary to provide sealing means between the rotor and adjacent static structure. Thus it is normally necessary to carry out such sealing adjacent the periphery of the rotor so as to seal off the gas flow passage and to prevent cooling air escaping into the gas flow annulus. Commonly the seal is effected between annular projections from the rotor or static structure which coact with annular grooves on the static structure or rotor respectively to form a labyrinth seal. However, because of the normally used root construction by which the blades are attached to the rotor, the only portion of the rotor available for mounting the sealing projection is inboard of the innermost extremity of the blade roots, and this leads to difficulties in feeding the cooling air from inside the sealing means to the blades of the rotor.

The present invention provides a structure which helps to reduce this problem.

According to the present invention a bladed rotor for a gas turbine engine comprises a rotor disc having a plurality of blade retaining slots in its periphery and a rotor blade mounted in each said slot, and sealing means between the rotor and adjacent static structure comprising an annular projection from adjacent the disc periphery adapted to coact with an annular feature on the static structure, the annular projection being made up of a plurality of abutting segments alternate ones of which project from the disc and one of the rotor blades respectively.

There may be more than one said annular projection, and the feature on the static structure which forms the outer part of the seal may comprise a pair of annular projections between which is formed an annular groove within which the projection from the rotor engages.

Alternatively this feature may comprise a brush seal or a pair of brush seals between which the projection extends.

The abutting segments may be formed with abutting faces angled so that centrifugal forces on the blades cause the faces to be forced into engagement.

A preferred embodiment of the rotor comprises a turbine rotor of a gas turbine engine.

Figure 4:
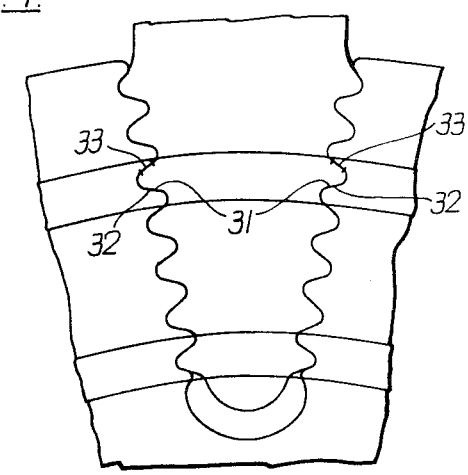
Figure 5:
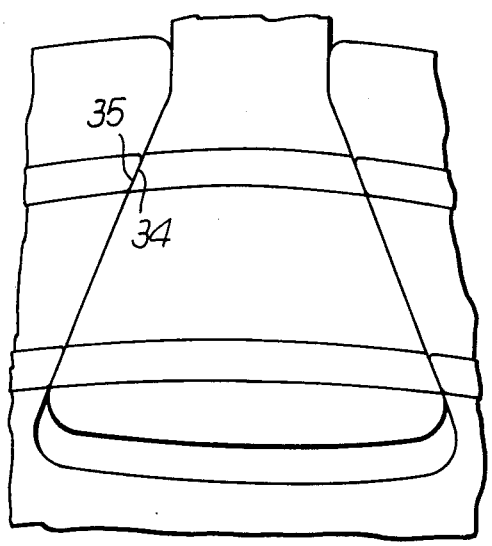
Figure 6:
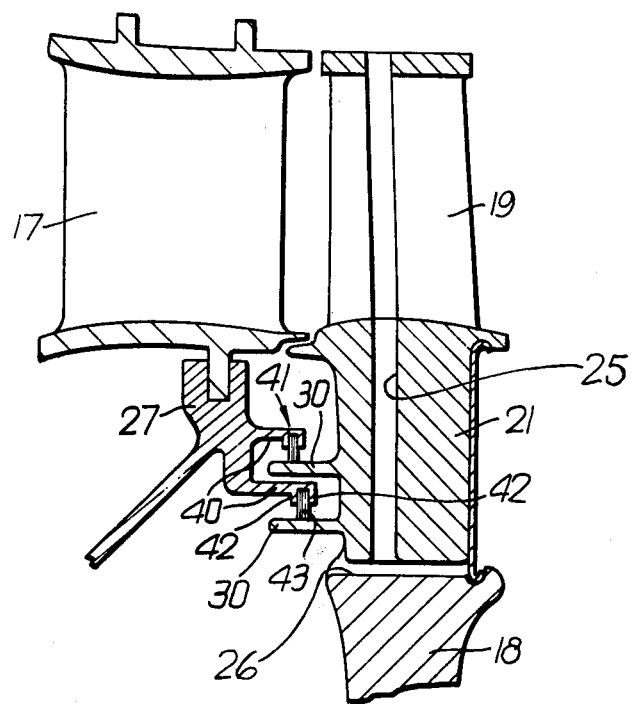

The invention will now be particularly described, merely by way of example, with reference to the accompanying drawings in which:

FIG. 1 is a partly broken away view of a gas turbine engine having a rotor in accordance with the invention, FIG. 2 is an enlarged cross-section of the peripheral structure of the rotor of FIG. 1, FIG. 3 is a section of the line 3—3 of FIG. 2, FIG. 4 is an enlarged section of part of FIG. 3, FIG. 5 is a view similar to FIG. 4 but of a further embodiment, and FIG. 6 is a view similar to FIG. 2 but of a yet further embodiment.

In FIG. 1 there is shown a gas turbine engine comprising a casing 10 within which are located in flow series an intake 11, compressor section 12, combustion section 13, turbine 14 and final nozzle 15. The casing 10 is broken away in the region of the turbine section to show the combustion chamber 16, nozzle guide vanes 17 and turbine rotor 18 which carries rotor blades 19.

Basic operation of the engine is conventional in that the engine takes air through the inlet 11, compresses it in the compressor section 12, mixes it with fuel and burns it in the combustion section 13 and uses the combustion gases to drive the turbine 14. The turbine 14 is connected to drive the compressor 12, and spend gases from the turbine exhaust through the nozzle 15 to provide propulsive thrust.

FIG. 2 shows the turbine region in greater detail and it will be seen that at the downstream extremity of the combustion section a plurality of nozzle guide vanes 17 are provided to direct combustion gases onto the rotor blades 19 of the turbine. The rotor blades 19 are mounted from the turbine rotor disc 18 in a conventional manner, that is the disc 18 is provided round its periphery with axially extending slots 20 of single or multilobe form. Each blade 19 is provided with a root section 21 whose shape corresponds with that of the slots 20; therefore the roots 21 fit in the slots 20 and the lobes prevent radial movement of the blades with respect to the disc 18.

In order to prevent any substantial axial movement of the blades with respect to the discs, a plurality of segmental locking plates, or a single locking ring 22 is provided which engages with a slot 23 in the disc rim and a facing slot 24 in each of the blades.

Because the turbine blades 19 operate in a hot environment it is necessary to cool them, and to this end channels 25 are formed in each blade extending from the inner extremity of the root portion 21 to the outer extremity of the aerofoil 19. It will be understood that although described illustratively as a simple single passage of cooling air through the blades, in a real life situation the cooling configuration would probably be more complicated.

The inner extremity of each root 21 is arranged to stop short of the slot 20, thus leaving a duct 26 in the rotor into which cooling air must be introduced. In the arrangement of this embodiment of the invention this air is simply fed into the space forward of the rotor disc 18 and then flows into the ducts 26.

However, because the cooling air is at a higher pressure than that of the hot gas in the annulus between the blades 19 and vanes 17, it is necessary to provide a seal between the rotor and adjacent stationary structure to prevent leakage of the cooling air into this annulus. Therefore a sealing structure is provided on the rotating and static structure. Attached to the radially inner platform of the vane 17 there is a seal carrying ring 27 which is provided with a plurality of annular projections 28 which extend toward the periphery of the disc 18 and the root portions of the blades 19. These projections are provided with radially extending flanges 29 so that adjacent projections and flanges together define an annular space having a relatively narrow annular opening facing towards the disc.

Cooperating with this sealing structure are a plurality of annular projections 30 extending from disc and blade structure, each projection 30 engaging with the respective opening into a space formed between the static projections 28 and thus providing a seal. The projections 30 will be seen to be radially outside the position of the innermost extent of the blade retaining slots 20 and therefore they are made up of a plurality of separate segments, alternate segments being formed integrally with the root portion of one of the blades and the periphery of the disc inbetween the slots 20. In this way the projections 30 may be mounted in the area outboard of the base of the slots 20 where normally it would not be possible to provide sealing.

This arrangement has advantages over the prior art construction. Thus as explained above, providing a seal outboard of the innermost extent of the blade roots 21 enables cooling air to be fed directly in at the side of the disc and into the ducts 26 at the base of the roots without it being necessary to provide additional passages in the disc structure. This would normally be necessary if the sealing arrangement were inboard of the blade roots and these passages are deleterious because they cause losses in the cooling air pressure and weaken the disc in a critical area.

One problem which may arise in the construction described above lies in the provision of sealing between the separate segments so as to avoid leakage through the abutments, and FIGS. 3 and 4 show how this is solved in the present construction, with FIG. 5 illustrating a further embodiment.

In FIG. 4 it will be seen that each of the blades 19 are held in the disc 18 by the engagement of the multilobed root 21 in the similarly shaped slot 20. The multilobed shape of the root is carried through the whole axial extent of the blade including the edges 31 of the blade-carried projections 30, as is the corresponding shape 32 of the slot 20 on the disc-carried projections 30. Therefore there is at least one face on each abutment between the segments which on radial growth of the blades 19 due to centrifugal effects will be brought into close engagement; in the drawing this is shown at 33. Therefore the segmented ring in operation becomes effectively a complete annular ring without leakage between the abutments.

The view of FIG. 5 shows how this effect is also achieved with a single lobed or 'dovetail' root. It will be seen that here the abutting surfaces defined by 34 and 35 each form a single sloping face, and substantially the whole face therefore engages on radial growth of the blade.

FIG. 6 is a view of a further embodiment in which the disc 18 and blades 19 are identical to those of FIG. 2. However, in this case instead of the seal carrying ring 27 having the projections 28 with flanges 29, two annular projections 40 each carry one brush seal 41, the brush seals engaging with the outer surfaces of the projections 30. The brush seals 41 are such as are disclosed in the U.S. Pat. No. 3,917,150 to Ferguson et al and commonly assigned to the assignee of this application, but briefly each comprises two annular face plates 42 between which are held a plurality of radially extending metallic bristles 43. The bristles are closely packed to seal against one another and contact the surface of the respective projection 30 to provide a seal with the projection.

We believe that it would be relatively simple to manufacture the structures as described. Thus it would be possible to assemble the blades to the disc, both blades and disc having roughly machined segments of the required projections ready formed on them. The assembly of blades and rotor can then be finally machined so that the projections are truly annular. Differential expansion of the rotating seal is better accommodated by this design than if the seal were a separate member carried by the rim and its weight and resulting stresses appreciably less.

It should be noted that a number of variations on the embodiment described above could be made. Thus the number of projections may vary from one to as large a number as can be accommodated. Again although the seal described is on the upstream face of a turbine rotor, it could clearly be used in a variety of locations in a gas turbine engine where a bladed rotor has to seal with fixed structure.

We claim:

1. A bladed rotor and adjacent static structure for a gas turbine engine comprising:
   a rotor disc having a plurality of blade retaining slots in its periphery;
   a plurality of rotor blades each having a blade root mounted in one of said slots; and
   sealing means between the rotor and the adjacent static structure, said sealing means including an annular projection carried by the rotor adjacent said rotor disc periphery, and an annular projection carried by the static structure and arranged to coact with the annular projection carried by the rotor from adjacent said rotor disc periphery, said annular projection carried by the rotor from adjacent said disc periphery being defined by a plurality of abutting segments, alternate ones of which project from said rotor disc and said rotor blades respectively, said abutting segments having abutting faces angled in a direction relative to a radially extending plane through the axis of the engine whereby centrifugal forces on said rotor blades cause said abutting faces to be forced into sealing engagement.

2. A bladed rotor as claimed in claim 1 and in which there are a plurality of said annular projections on the rotor, said last-mentioned projections being radially spaced from each other.

3. A bladed rotor as claimed in claim 1 and in which said annular projection on the static structure comprises a pair of radially spaced annular projections between which is formed an annular groove within which said projection from the rotor extends.

4. A bladed rotor as claimed in claim 1 and in which said annular projection on the static structure comprises a brush seal carried by said annular projection on said static structure, said brush seal engaging with one annular surface of the annular projection of said rotor.

5. A bladed rotor as claimed in claim 1 and in which said abutting faces of said segments are formed as continuations of the profile of said blade roots and said retaining slots.

6. A bladed rotor as claimed in claim 1 in which said rotor is a turbine rotor of a gas turbine engine.

7. A bladed rotor as claimed in claim 1 in which said annular projection carried by the rotor is spaced from said annular projection on said static structure.

8. A bladed rotor as claimed in claim 7 including a brush seal carried by one of said annular projections and engaging the other of said annular projections.

* * * * *

Notice of Adverse Decision in Interference

In Interference No. 100,811, involving Patent No. 4,218,189, G. Pask, SEALING MEANS FOR BLADED ROTOR FOR A GAS TURBINE ENGINE, final judgment adverse to the patentee was rendered May 16, 1986, as to claims 1, 5, 6 and 7.

[*Official Gazette November 25, 1986.*]